Aug. 7, 1956 W. F. W. VON GLAHN 2,757,604
DECODING AND CHARACTER FORMING MEANS FOR HIGH SPEED RECORDER
Filed Aug. 26, 1953 5 Sheets-Sheet 1
FIG. 12
| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
FIG. 13
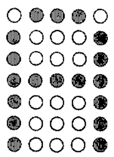
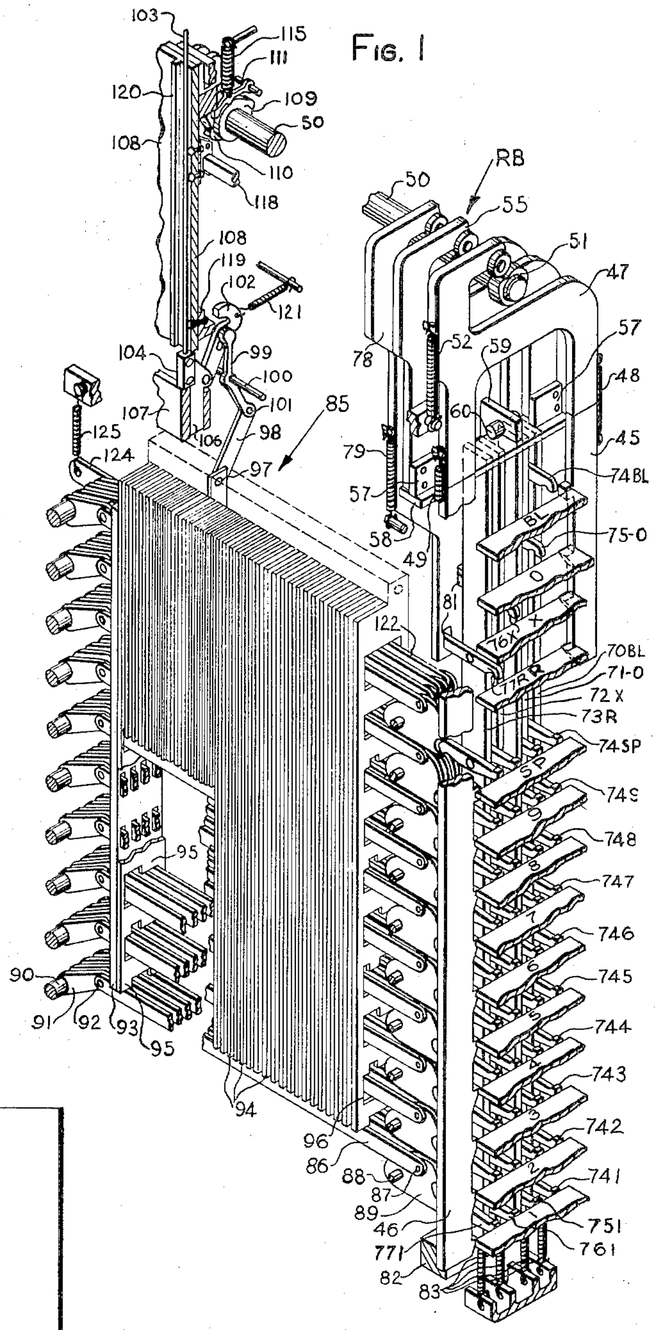
FIG. 1
FIG. 5
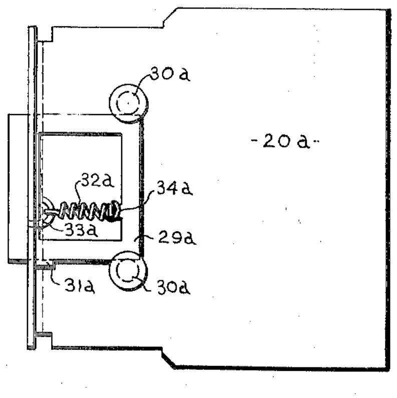
INVENTOR.
WILLIAM F. W. VON GLAHN
BY
Jerome Bauer
ATTORNEY

DECODING AND CHARACTER FORMING MEANS FOR HIGH SPEED RECORDER

Filed Aug. 26, 1953 5 Sheets-Sheet 2

INVENTOR.
WILLIAM F. W. VON GLAHN
BY
Jerome Bauer
ATTORNEY

Aug. 7, 1956 W. F. W. VON GLAHN 2,757,604

DECODING AND CHARACTER FORMING MEANS FOR HIGH SPEED RECORDER

Filed Aug. 26, 1953 5 Sheets-Sheet 3

INVENTOR.
WILLIAM F. W. VON GLAHN
BY
Jerome Bauer
ATTORNEY

INVENTOR.
WILLIAM F. W. VON GLAHN
BY
Jerome Bauer
ATTORNEY

DECODING AND CHARACTER FORMING MEANS FOR HIGH SPEED RECORDER

Filed Aug. 26, 1953 5 Sheets-Sheet 5

ZONE AREA STORING ELEMENTS

| | BL | R | X | O |
|---|---|---|---|---|
| SP | | & | / | 0 |
| 1 | 1 | A | J | % |
| 2 | 2 | B | K | S |
| 3 | 3 | C | L | T |
| 4 | 4 | D | M | U |
| 5 | 5 | E | N | V |
| 6 | 6 | F | O | W |
| 7 | 7 | G | P | X |
| 8 | 8 | H | Q | Y |
| 9 | 9 | I | R | Z |

NUMERIC AREA STORING ELEMENTS numeric zero

INVENTOR.
WILLIAM F. W. VON GLAHN
BY
Jerome [signature] Bauer
ATTORNEY.

United States Patent Office 2,757,604

Patented Aug. 7, 1956

2,757,604

DECODING AND CHARACTER FORMING MEANS FOR HIGH SPEED RECORDER

William F. W. Von Glahn, Valley Stream, N. Y., assignor to Burroughs Corporation, Detroit, Mich., a corporation of Michigan Application August 26, 1953, Serial No. 376,734

9 Claims. (Cl. 101—93)

Figure 9:
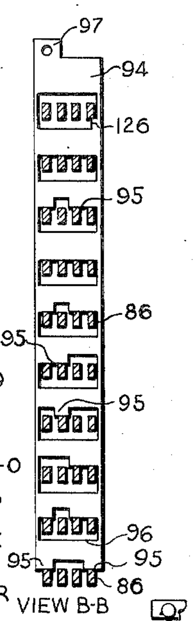

This invention relates to improvements in recording machines and has particular reference to a machine wherein a plurality of recording elements may be selected to form and record a desired character.

Selective character-forming recording machines are becoming increasingly popular because of their ability to produce high-quality work at high speeds. There have been developed machines of this character which will attain extremely high operating speeds and which are well suited for installations where the work load is exceptionally heavy. These prior machines, however, are so designed that they are apt to be too expensive and bulky for use in other situations where the volume of work is not quite so large and where the cost and size of the installation accordingly must be kept within certain limits. Consequently, there is a strong demand at the present time for a selective character-forming recording machine which has a satisfactorily high speed of operation and which at the same time will fulfill the more stringent requirements as to cost, size and simplicity of construction dictated by the available market. Applicant's present invention deals with the solution of this particular problem.

The size, complexity and cost of a character forming recorder will depend to a considerable extent upon the design and construction of the decoding and character forming means employed therein. The function of the means just mentioned is to convert the coded input data to character patterns which can readily be manifested by the recording elements. In those cases where the recording machine must have an extremely high output rate, the decoding and character forming means is likely to be a rather expensive part of the machine. This can be justified by the enormously heavy work loads which the machine will be called upon to handle in service. However, in those situations where the anticipated work loads are not quite so heavy, competitive conditions will require that relatively more emphasis be placed upon economical construction, but without unduly sacrificing speed.

An object of the present invention is to provide an improved decoding and character forming means which can be built at a sufficiently low cost and which will function at a sufficiently high speed to meet competitive conditions where the work loads are only moderately heavy.

A further object is to provide a mechanical decoding and character forming means constructed of parts that are easy to manufacture and assemble and which are rugged and dependable in service.

Still another object is to provide a mechanical decoding and character forming means operating on a novel lever principle which avoids the disadvantages of prior mechanical devices used for the same purpose.

Other objects of the invention will be pointed out in the following description and claims and illustrated in the acocmpanying drawings which disclose by way of example, the principle of the invention and the best mode which has been contemplated of applying that principle.

Figure 4:
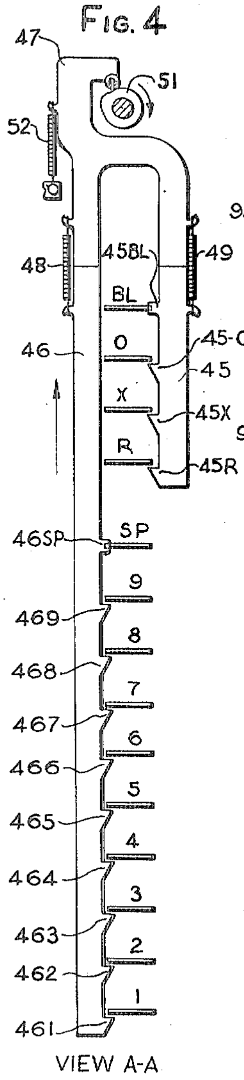
Figure 3:
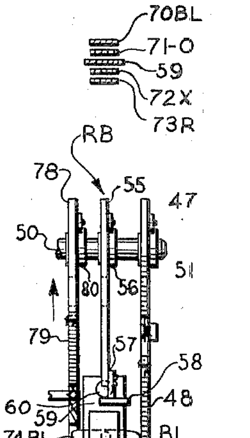
Figure 2:
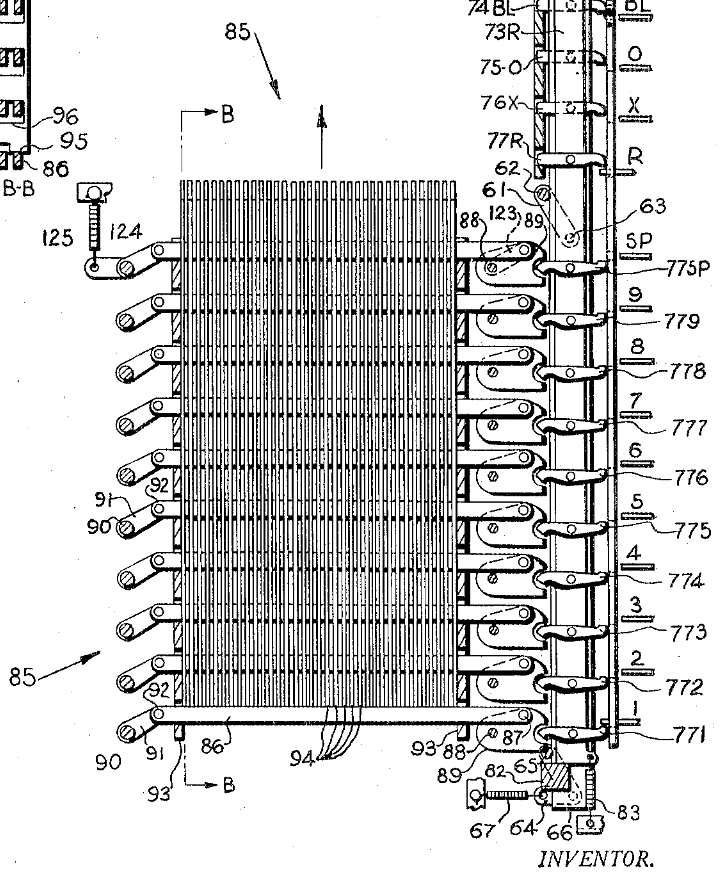
Figure 10:
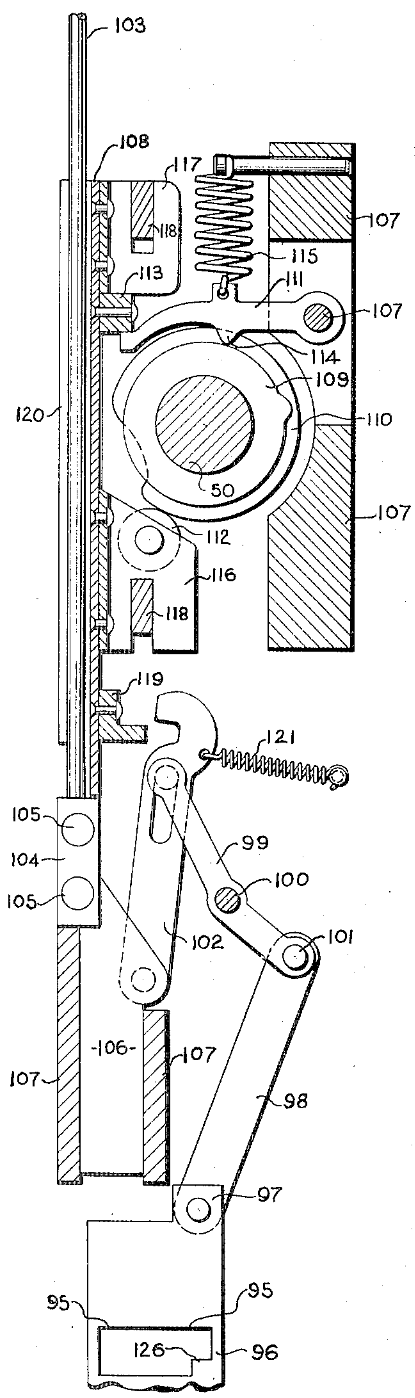
Figure 6:
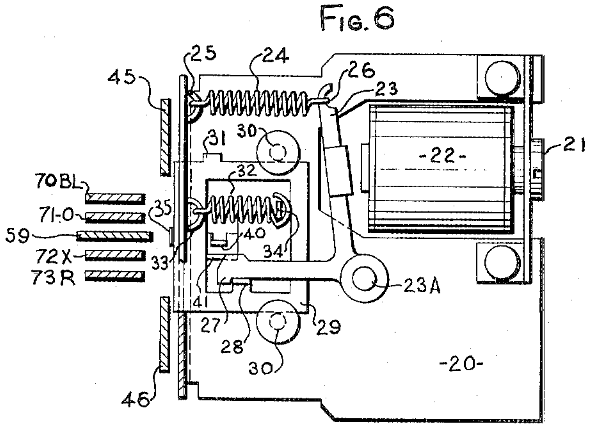
Figure 7:
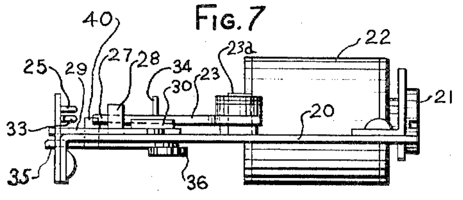
Figure 8:
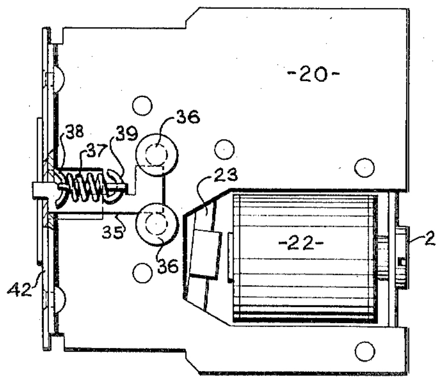
Figure 11:
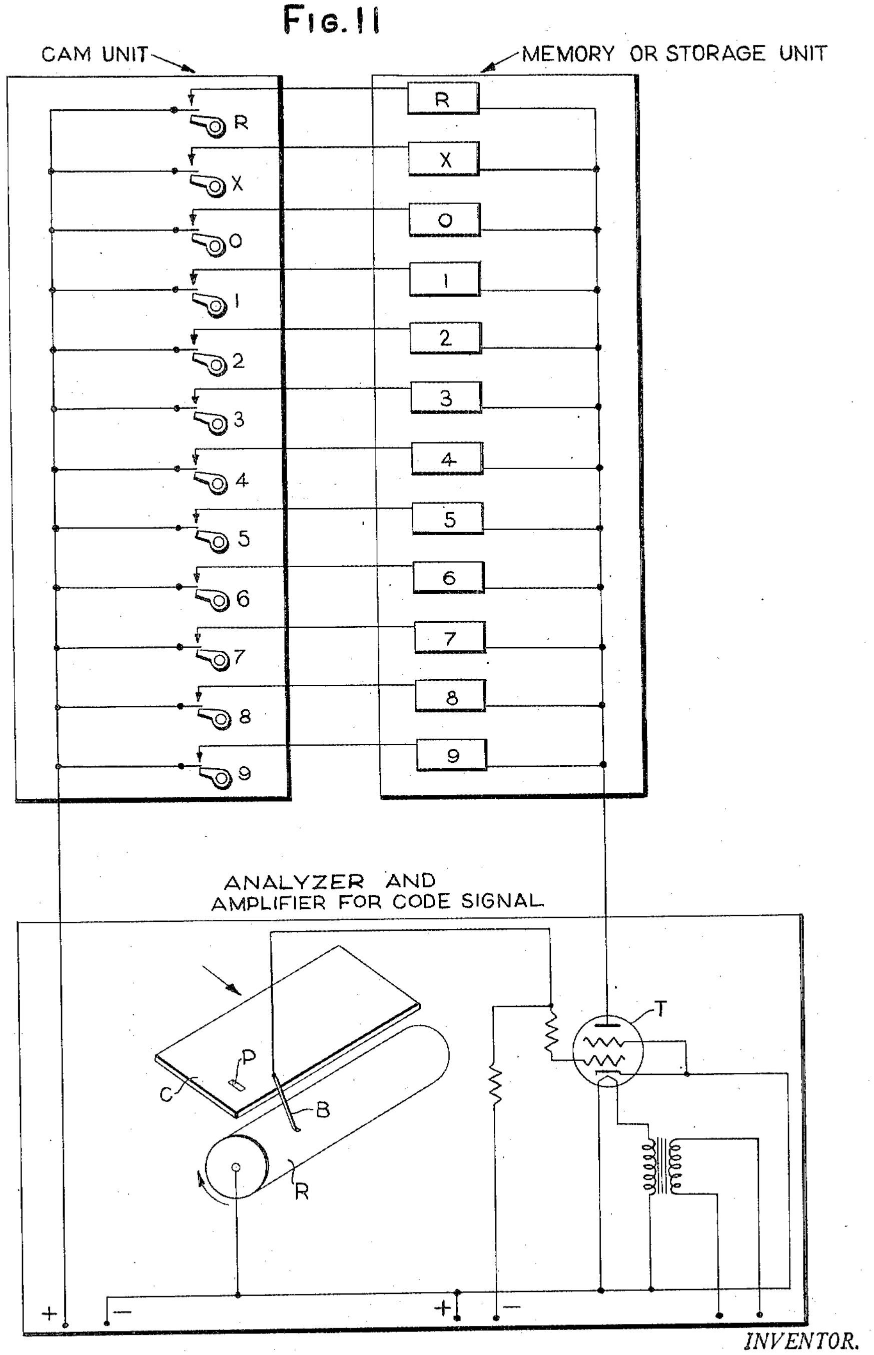
Figures 14, 15:
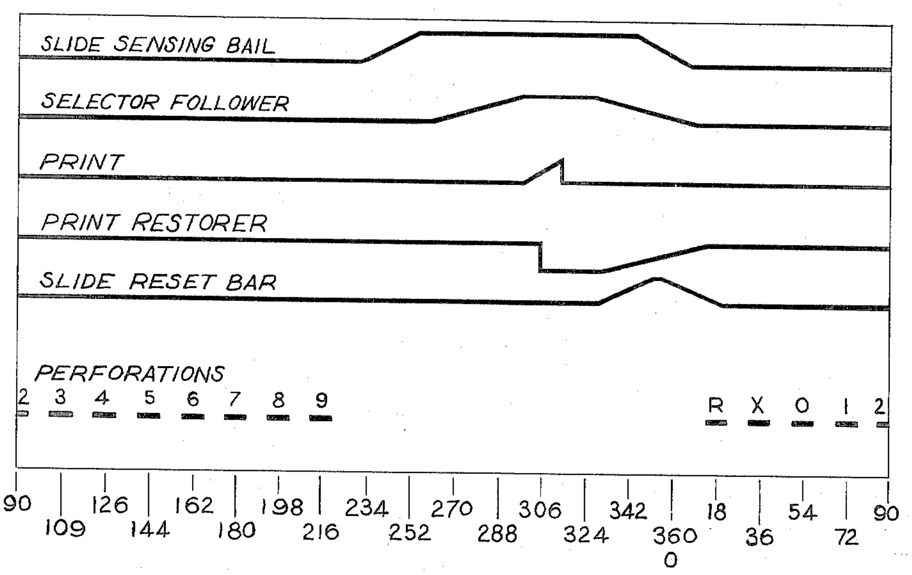

In the drawings:

Fig. 1 is a partial perspective view of a section of a machine constructed in accordance with the principles of the invention, certain portions of this machine being broken away to facilitate illustration of the essential features, Fig. 2 is a front elevation of a portion of the section as shown in Fig. 1 without the actuating unit and with the storage elements R and 1 in the storing or operative positions, Fig. 3 is a top view of the four zone or combining members and the restoring bail for the storage elements as seen in Fig. 2, Fig. 4 is a side view of Fig. 2 showing the normal position of the sensing bails and the storage slides, Fig. 5 is a plan view of the impositively operated blank and/or the special character storage slide shown in its extended position, Fig. 6 is a top plan view of a positively operated storage slide, the storage unit sensing bail, the restoring bail and the zone or combining members, Figs. 7 and 8 are a side and bottom view respectively of the storage slide shown in Fig. 6, Fig. 9 is a view of one of the coded slides taken on line B—B of Fig. 2, Fig. 10 is a view showing a preferred embodiment of the actuator unit, Fig. 11 is a schematic diagram portraying a method of analyzing data from a record card and how the input signal is transmitted to the storage elements of the machine, Fig. 12 discloses a matrix layout of the recording head and the numbering of the recording elements, while Fig. 13 shows a matrix of the recording elements for the letter A, Fig. 14 is a chart showing the relative timing of the the principal parts of the machine, Fig. 15 is a chart showing how the zone data storing elements combine with the numeric data storing elements to determine the characters to be recorded.

For want of a better description the phrase "recording machine" will be used throughout the application to include such analagous devices as punching, marking and printing machines.

To enable a clear understanding of the principle of operation only one of the many similiar sections of the machine is shown in the drawings. This section has been arbitrarily divided into a storage or memory unit, a decoding or information combining unit, a transfer or character forming unit and a recording element actuator unit. This arbitrary division, and application of definitions to the units, should in no way be limiting but should be viewed only as an attempt to permit an easier description and understanding of the machine. At times the section will be referred to as the machine or the recording machine. One of these sections will be required for each character to be recorded. The decoding unit and the character forming unit, together with certain parts of the memory unit in some instances, may be referred to collectively as the "decoding and character forming means" of the machine.

The recording machine of my invention is designed to operate on information or data derived from a punched record card. The machine is intended to operate on the numeric and zone code system wherein the numeric and zone information or data taken from a record is stored in the storage or memory unit. In the storage or memory unit there is provision for storing both numeric and zone information or data. This information is subsequently utilized by the decoding unit. The information or data which is stored in both the numeric and zone areas of the storage unit is analyzed, combined and decoded in the operation of the decoding unit, and after which it is translated to the data transfer or character forming unit. In the character forming unit the combined numeric and zone information is transmitted to determine and select certain ones of the recording elements, there being 35 in number, for recording a selected character. The selected recording elements are engaged with an actuating unit which positively moves the recording elements toward recording position and then positively returns them from recording position.

Fig. 11 is a simple schematic diagram portraying a novel method of analyzing data from a single column of a record card with the data being passed on to memory or storage unit of the recording machine. For the sake of clarity, only one such analyzing unit is shown. However, it must be understood that there will be as many of these units as there are columns on the cards to be analyzed. In Fig. 11 the memory or storage unit is caused to operate by current coming from an amplifier unit through a cam unit consisting of cam operated switches. For example, each of the positively operated storage or memory units are shown in Fig. 11 as being connected to both an amplifier unit and a cam unit. The cam unit is connected in time relation with the feed of the record card C so that at predetermined periods throughout each cycle of the sensing operation, each one of the cams will make a circuit with its corresponding storage element. The cam unit may be a single element having a plurality of insulated conductors, such as a distributor or it may consist of a multiplicity of cams as shown. The card C is fed in predetermined time relation through an analyzer device consisting of sensing brushes B and contact roller R, the feeding time of the card being the same as that of the timing of the cams. As the card C passes between the sensing brush and roller, the brush will be raised from the roller to prevent the firing of an amplifier tube T. When, however, the brush encounters a perforation P in the card, the brush and roller will complete a circuit to fire tube T. The firing of tube T will coincide with the closing of the contact whose cam movement corresponds in time relation to the perforation on the card to complete the circuit to the proper storage element. Thus, if the perforation P on the card is to designate the printed character numeral 1, the timed feed of the card C through the analyzer, and the timed closing of the contact 1 by the movement of the cam 1 in the cam unit, will coincide to complete the circuit in one direction through the sensing brush B, roller R, tube T to the storage element 1, and in the other direction through the closed contact 1 to the storage element 1. In this manner any number of storage elements in each column may be operated to store information. If there are two perforations P in a column on the card, as each perforation passes through the analyzer the corresponding storage elements allocated to the column will be operated in the same manner as described above.

Fig. 14 shows five principal parts charted in timed relation with the feed of the record card through the machine. The designation "Perforations" on the chart refers to the respective times when perforations at the correspondingly numbered index points on a record card may be sensed as the card passes through the machine. Reference will be had to the chart whenever it is believed that it will aid in the description.

*Storage or memory unit*

The storage or memory unit is divided into two distinct sets or areas of storing elements namely zone elements BL, R, X and O, and numeric elements SP and 1 to 9 respectively, see Figs. 1 and 2. In the zone set or area there are four storing elements, three of which are positively operated and the fourth or blank storing element BL, is impositively operated. In the numeric set or area there are ten storing elements of which those numbered 1 to 9 consecutively have means for positively operating the elements whereas the tenth or special character storing element SP, is impositively operated. The positively operated zone elements O, X and R and the positively operated numeric elements 1 to 9 inclusive receive their signal from the analyzer (Fig. 11), which may sense a perforation in the record card in either the O, X or R positions, or in any one of the 1 to 9 numeric positions or any combination thereof. As described above, when a coinciding signal is received from the cam and amplifier unit by a positively operated storage element, the storage element is then caused to operate.

The positively operated storage elements or slides O, X, R, 1, 2, 3, 4, 5, 6, 7, 8 and 9 are all basically similar in structure, therefore, a description of any one of the elements will suffice for all (Figs. 6, 7 and 8). The storage element or slide is mounted in a housing 20 which is in turn fixed to a portion of the framework (not shown) of the machine. Held to the housing 20 as by an adjusting screw 21 is an electromagnet 22 which receives the coinciding signal from the cam and amplifier units. Pivotally mounted as at **23*a* is a pivoted latch 23 attracted by the magnet 22 in opposition to the pull of the spring 24, which spring is hooked to the housing at 25 and to the latch at 26. Latch 23 has a hook portion 27 which cooperates with a catch 28 on the slide 29. Slide 29 is slidably guided on the housing by posts 30 while limiting means 31 on the slide limits the sliding movement of the same. Spring 32 normally in expanded position is hooked to the housing as at 33 and to the slide as at 34. On the underside of the housing is a residual ram 35 guided by posts 36 and spring urged outwardly by spring 37 attached to the housing as at 38 and to the ram as at 39. Extending upwardly from the bottom of the housing is an abutment 40 which is attached to the residual ram. The abutment 40 is intended to abut the tapered surface 41 on the latch 23 so as to overcome any residual magnetism which might tend to hold the latch 23 in engagement with the electromagnet 22** after the electromagnet has been de-energized.

When the electromagnet 22 receives the signal from the amplifier unit and the proper switch in the cam unit is closed, the latch 23 is drawn toward the electromagnet to release the hook 27 from engagement with the catch 28. Spring 32 urges the slide 29 outwardly from the housing toward its data storing position. When it is desired to move the slide back to its inactive position such as shown in Fig. 6 a restoring bail RB, described later, positively abuts the slide and moves the same back into the housing. Occasionally, residual magnetism tends to hold the latch 23 against the electromagnet 22 in opposition to the pull of spring 24. To avoid this condition and to insure that the hook 27 will always engage the catch 28 at the proper time, the member 40 on the residual bail is positioned so as to momentarily come into contact with the angular surface 41. The restoring bail during its full slide restoring movement abuts against the residual ram 35 to move the member 40 against the surface 41 and to overcome any residual magnetism which may tend to hold the latch 23 to the core of the electromagnet 22. The residual ram as seen in Fig. 8 normally is spring pressed forward to abut a plate 42 on the housing 20, thus the ram is retained in the normal position as shown in Fig. 8. When the restoring bail abuts the ram 35, the ram moves only a sufficient distance against the pull of spring 37 and away from plate 42 to permit the member 40 to come in contact with the surface 41. As the restoring bail moves back away from the slide and ram, the ram also moves back and is limited in its backward movement by the plate 42.

The impositively operated storage elements, namely, the blank storing element BL and the special character storing element SP, are structurally similar to the positively operated storing elements as described above, except for the fact that the impositively operated storage elements have no electromagnetic or latch operating means. The term "impositively" is not intended to be one of art; it is used here in an attempt to describe the absence of positive operating means such as used in the positively operated storage elements. In Fig. 5 there is shown an impositively operated storage element in which the slide 29*a* is guided on the housing 20*a* between the posts 30*a*, while stop 31*a* limits the outward movement of the slide. Actuating spring 32*a* is connected to the housing at 33*a* and to the slide at 34*a*. As shown in Fig. 5 the slide is now in its extended or storing position. There need be no residual ram such as that shown in the positively operated storing elements since there is no electromagnetic or latch action utilized.

Situated in front of the storing elements are two sensing bails 45 and 46, see Figs. 1, 2, 4 and 6. Each bail cooperates with and is individual to a set of storage elements. Each bail has engaging means for engaging certain of the storing elements in each set and blocking means for blocking the storing of data in certain of said storing elements. The zone sensing bail 45 is provided to cooperate with the zone storing elements BL, O, X and R by the provisions of teeth 45–O, 45X and 45R, and blocker or abutment 45BL. The numeric sensing bail 46 is very much similar to the zone sensing bail in that it has teeth numbered consecutively from 461 to 469 inclusive cooperating with the numeric storing elements 1 to 9 and a blocker or abutment 46SP similar to the abutment 45BL cooperating with the special character storing element SP. Both the numeric sensing bail and the zone sensing bail are independent each from the other and are reciprocally mounted on the frame of the machine.

Means in the form of a sensing cam follower 47 is yieldingly connected to the zone sensing bail 45 by spring 48 and to the numeric sensing bail 46 by spring 49 to reciprocate the bails in a predetermined timed relation (Fig. 14) with the feed of the record card. Cam follower 47 reciprocates in response to the rotation of cam shaft 50 and cam 51 and remains in contact therewith by virtue of spring 52.

To enable the machine to record the required selection of characters, data from both the zone and numeric portions of a record card will have to be stored in the storage or memory unit of the machine. This may be seen more clearly from the chart in Fig. 15. If the character A were to be recorded the record card would have a perforation in the R line in the zone portion of the card and a perforation in the 1 line in the numeric portion of the card. In another example, if it were desired to record the numeral 1 both the numeric storing element 1 and the zone storing element BL will have to operate (Fig. 15). At this point it will be remembered that the storing element 1 of the numeric set is positively operated upon the receipt of a coinciding signal from the cam and amplifier units whereas the storing element BL and incidentally storing element SP are impositively operated. Since the present record card has provision for only three perforations in the zone area and nine in the numeric area, means are provided on the sensing bails to determine when the impositively operated slides will be operated to store data.

The blocker 45BL on the zone sensing bail and the blocker 46SP on the numeric sensing bail are normally in blocking relation with respect to their impositively operated slides BL and SP respectively. When the cam follower 47 is reciprocated by cam 51 the sensing bails 45 and 46 have a tendency by virtue of their springs 48 and 49 respectively to reciprocate with the cam follower to uncover and unblock the storage slides BL and SP. However, as seen in Fig. 14, the slide sensing bails do not reciprocate nor become effective until after the last perforation in the record card has passed through the analyzer unit, or until all the positively operable storing slides have had an opportunity to have been operated. Thus if any of the positively operated slides in each of the sets has been operated, the impositively operated slide in that set will not operate, as will be explained.

Looking at the zone set of storage elements in Fig. 1 it will be seen that if either of the zone storing slides R, X or O are operated the operated slide will be moved out into the path of the zone sensing bail by spring 22. Assume then, for example, that the R storing slide had been operated as in Fig. 2, the tooth 45R would engage and catch under the slide as the zone bail reciprocated with the follower 47 to halt the upward movement of the bail 45. The cam follower 47 would continue on its upward reciprocating stroke and the spring 48 interconnecting the bail 45 and follower 47 would be expanded to permit the halting of the bail and the continued upward reciprocation of the follower. The halting of the bail 45 by the storing slide R insures the continued blocking of the zone storing element BL.

As previously noted, if the numeral 1 were to be recorded both the zone storing slide BL and the numeric storing slide 1 (Fig. 15) would have to be operated. Since, of the two slides, the only positively operated slide would be the numeric set storing slide 1, there would be a perforation in the 1 line in the numeric portion of the record card. The numeric sensing bail 46 would then follow the same pattern as that described for halting the zone sensing bail at the R storing slide except, however, that the numeric sensing bail 46 will be halted by the tooth 461, and while the interconnecting spring 49 will expand, and the follower 47 will continue its reciprocation, the impositively operated storing slide SP will be blocked by the numeric sensing bail blocker 46SP. Here, however, the operation of the zone sensing bail in the recording of numeral 1 will be different from that previously described when the zone set slide R was in data storing position. Since none of the positively operated zone storing elements R, X or O will have been pulsed into data storing operation, the zone sensing bail 45 will reciprocate with the follower 47 unhalted in its reciprocating movement. As the bail 45 reciprocates upwardly, blocker 45BL also moves up and out of blocking engagement with the slide BL permitting the spring 32*a* to move the slide out into data storing position.

The above description of the manner by which the impositively operated slide BL in the set of zone data storing elements is permitted to store data is the same with respect to the slide SP in the set of numeric data storing elements. If none of the positively operated storage slides in the numeric set are properly signalled the numeric sensing bail 46 reciprocates up and out of blocking engagement with the data storing slide SP. If none of the positively operated data storing slides in the zone set are properly signalled, the zone bail 45 reciprocates up and out of blocking engagement to uncover the data storing slide BL. When both the impositively operated numeric slide SP and the impositively operated zone slide BL are in data storing position a space will be provided in the line of recording (Fig. 15). This space results from the absence of perforations in the column of the record card being sensed. As will be obvious later, it is possible, if desired, to utilize the combination of the impositively operated storing elements to record a character.

When during the cycle of operation it is desired to reset the slides of the storing elements, a storage element restoring bail generally designated RB is actuated. The restoring bail reciprocates in timed relation with the feed of the record card to simultaneously restore the data storing slides from their data storing position to their normal inoperative position. The restoring bail consists of a cam bail follower 55 which slides on and is reciprocated by the cam 56 on cam shaft 50. Connected to the bail follower 55 as by blocks 57 is a ride plate 58 which has an aperture therein (not easily visible in Fig. 1). The purpose of the aperture is to admit a bail 59 to move widthwise relative to the ride plate 58. Bail 59 has a ride roller 60 at its upper portion, the roller being permitted to ride on and relative to the plate 58, but reciprocating therewith. Employed to guide the bail movement is a link arrangement. Intermediate the ends of the bail 59 is a link 61 pivoted to the machine frame at its one end at 62 and to the bail 59 at 63. Attached to the lower portion of the bail is link 64 pivoted to the frame at 65, to the bail 59 at 66, and yieldingly connected again to the frame by spring 67.

As the bail follower 55 is reciprocated by rotating cam 56, ride plate 58 and roller 60 reciprocate also; however, because of the link arrangement (61, 64) the bail 59 will move not only in a path approximating the vertical movement of the ride plate, but also forward toward the data storing elements. The aperture in the ride plate, as mentioned previously, permits the widthwise movement of the bail forward of and relative to the plate. The downstroke of the bail follower is aided by the yielding action of the spring 67. The forward movement of the bail is sufficient to reset all the positively operated slides so as to be held in inoperative position by their respective latches 23 and to actuate the residual ram 35. The impositively operated slides are reset behind the blockers on their respective sensing bails as the sensing bails reciprocate back down into blocking position (Fig. 14).

*Decoding or information combining unit*

The portion of the machine arbitrarily denominated as the decoding means or information combining unit consists of at least one movable or reciprocable combining means. The combining means or zone bars 70BL, 71–O, 72X and 73R are shown as four in number, each combining member being provided to cooperate with a respective zone data storing element. For example, the combining member 70BL will cooperate with only the blank data storing element BL, while the member 71–O will cooperate with only the O storage element in the zone set, and so on for the members 72X and 73R.

Cooperating with and mounted on the combining members for movement with and pivoted relative thereto are a plurality of distinctly operative sets of data receiving means or coded parts. The parts on each combining member are divided into zone and numeric sets to coact and to receive from the proper zone and numeric data storing elements the data stored therein. The receiving parts have means at their forward ends to receive data from the storing elements and means at their back ends for translating the data for a purpose to be described.

The zone set of receiving means consists of four parts in the form of short levers respectively designated 74BL, 75–O, 76X and 77R, Figs. 1 and 2, which parts are shown in Fig. 1 as being staggered in height. Each one of the four parts is pivotly mounted on a different combining member to permit the combining member on which it is mounted to receive and to be responsive to data stored in only one of all of the zone storage elements. Hence, the part 74BL is mounted on combining member or zone bar 70BL to permit the zone bar to operate in response to the operation of storage element BL when data is stored therein. Similarly the parts 75–O, 76X and 77R are pivotly mounted on zone bars 71–O, 72X and 73R respectively to cooperate with storage elements O, X and R respectively.

The numeric set of receiving means or coded parts are similar in structure and operation as the corresponding parts of the zone set. However, in the arrangement of the parts in the numeric set each combining member or zone bar has a coded part in the form of a short lever pivotly mounted thereat for cooperating with each of the numeric data storing elements. It has been believed best to number the numeric set of receiving parts so that they will have as a prefix the two digits of the zone receiving part on the same combining member and as a suffix the designation of the numeric data storing element with which it is to cooperate. In this manner the numeric set of parts on the zone bar 70BL which has zone receiving part 74BL will be identified as 74SP, 749, 748, 747, 746, 745, 743, 742 and 741. In a similar manner the numeric set of parts on zone bar 71–O having zone part 75–O will be identified (but not shown in the drawings) as 75SP, 759 to 751. The same is also true for the numeric set of parts on zone bars 72X and 73R. The parts on bar 72X will be identified as 76SP, 769 to 761 while the parts on bar 73R will be identified as 77SP, 779 to 771 (Fig. 2).

A means in the form of a selector follower 78 is provided for cyclically operating the decoding unit. Attached to the follower 78 is a spring 79 which retains the follower in constant engagement with cam 80 to permit reciprocation of the follower in timed relation with the feed of the machine. A plurality of means such as the openings or apertures 81 (Fig. 1) are staggered to coincide with and to accommodate the translating ends of the receiving parts 74BL, 75–O, 76X and 77R of the zone set.

The arrangement of the zone parts on the combining members or zone bars is such as to permit one of the bars to become operative only when its corresponding zone data storing element is in data storing position. This is also true, of course, of the arrangement of the numeric data storing elements. Thus, if zone data storing slide R and numeric data storing slide 1 are in data storing position when follower 78 reciprocates upwardly, the follower tends to pivot the zone parts about their pivots on their respective zone bars. The zone bars are yieldingly retained against a common stop 82 by springs 83 which are attached to the frame of the machine. The R data storing slide will prevent the pivoting of the cooperating part 77R thereby insuring that the zone bar 73R will move upwardly with the follower 78. As the bar 73R moves upwardly the numeric part 771 will, at its data receiving end cooperate with and be engaged by the numeric slide 1. The engagement of the part 771 with the slide 1 and the continued upward movement of the zone bar will cause the part 771 to pivot clockwise about its pivot for a purpose which will be obvious later.

This is the manner by which the data in the zone data storing elements and the numeric data storing elements is received by the zone and numeric receiving parts and placed in or combined by the combining member to which the parts are attached. It is difficult to define specifically when the actual combining function is said to occur, however, it may be said to occur between the time when the selector follower moves upwardly and when the data is transferred by the translating ends of the numeric data receiving parts to the character forming unit. While the operation of only the R combining member or zone bar 73R has been described it will be obvious that the zone data receiving parts on the other zone bars will operate in the same fashion as described above when their respective zone data storage elements are operated. The same is true also of the numeric data receiving parts.

*Data transfer or character forming unit*

A data transfer or character forming unit or means is designated generally by the numeral 85. This unit is responsive to or conditioned by the operation of the combining means in the decoding portion of the machine. The unit selectively operates selecting means to select certain of the recording elements for recording.

The transfer unit 85 consists of groups of relatively spaced, parallel moving crossbars 86. The crossbars are spaced in groups to form four vertical columns and ten horizontal rows. Pivotly connected to each individual crossbar 86 as at 87, and pivoted to the frame at 88 is a crank means 89. The crank means or member 89 operatively connects each crossbar 86 to a data receiving part in one of the two sets of said parts. For reasons to be described later, all but one of the crossbars are connected to individual crank members 89. The crank members are in turn connected with the translating ends of the numeric set of data receiving parts and are operated in response to movement thereof.

When the part 771 (Fig. 2) abuts the slide 1 at its receiving end while its zone bar 73R is moved upwardly, the crank member 89 connected to the translating end of the receiving part 771 will pivot about the pivot 88 to lift its associated crossbar. Also pivotly mounted at its one end to the frame as at 90 is a link 91 which is pivotly connected at 92 to its associated crossbar at its other end. The combined pivotal mounting of link 91 and crank 89 combine upon the movement of the crank to move the associated crossbar upwardly in a parallel motion. Combs 93 are provided to guide and retain the crossbars in proper alignment. Two of these combs are shown in Fig. 2 while for clarity only one is shown in Fig. 1.

Slide means or members 94 are mounted to cooperate with the crossbars (Figs. 1, 2 and 9). There are 35 of these slides one for each recording element in the recording head (see Fig. 12). Each slide has a selectively arranged means or parts 95, selectively engageable with and selectively operated by the movable crossbars. Defined in the slides are a plurality of openings 96 in which some of the crossbars are accommodated and through which the crossbars pass. The bottommost row of crossbars need not be accommodated in an opening as will be obvious. The selectively arranged parts 95 may be included in the openings 96 or may be unenclosed while cooperating with the bottommost row of crossbars. At the top of each slide is an extension 97 for pivotal connection to a link 98. A crank arm 99 is pivoted intermediate its ends about a rod 100 which is fixed to the frame. One end of the crank arm is connected pivotly to the link 98 as at 101 while its other end has a slide connection with a latch 102.

In each recording head, for every character forming slide 94, there is a recording element 103. The lower end of the recording element is set into and retained in a holder 104 as by any suitable means 105. To guide the recording element at the time it is being moved to recording position, a tail 106 is also fastened to holder 104 by means 105. In some cases it is possible for the tail 106 and holder 104 to be one member. The tail 106 is mounted in the frame 107 to be slidably guided therein. In the normal position, holder 104 rests upon a shoulder formed by the frame 107.

*Actuator unit*

Situated behind the recording elements its a plate 108. The plate is common to all of the recording elements. Timed rotating shaft 50 has two cams 109 and 110 fixed to it. The cam 109 is so formed as to positively move the actuator plate 108 into recording position, as for example, by way of pivoted link 111. Cam 110 is so formed as to positively return the actuator plate 108 from recording position, as for example, by the provision of contacting roller 112.

Cooperating actuator link 111 is pivoted at its one end to the frame 107 and abuts a surface 113 at its other end. The surface 113 may be formed as a part of the actuator plate 108 or may be a separate element attached thereto, as shown. Intermediate the ends of the link 111 is surface 114 cooperating with the cam 109. A spring 115 is attached at its one end to the link 111, and at its other end to the frame 107 to urge the link upwardly and in constant engagement with surface 113. The positive return roller 112 is mounted in the lower guide portion 116 which may be formed as a part of the actuator plate or it may be a separate element attached thereto.

Formed as a part of the actuator plate is also a second guide portion 117 which acts in exactly the same manner as the guide portion 116. Fitted in both the guide portions 116 and 117 are cross guide members 118 which may be part of the frame 107. A bail 119, common to all of the latches 102, is provided to be engaged by the selected latches. A straightener or stiffener 120 is formed as part of the plate 108 to give strength to the same. Resiliently urging the latch from engagement with the common bail 119 is a spring 121 fastened at its one end to the latch 102 at its other end to the frame.

The data transfer or character forming unit operates in conjunction with the actuator unit in the following manner. Assuming that the data receiving part 771 is to transmit the data stored in the R zone slide and the numeric slide 1, then the crank 89 cooperating with the data receiving part 771 will operate in response to the translating movement thereof. As the crank 89 pivots about its pivot 88 the associated crossbar 86 moves upwardly in a parallel motion. Each one of the 35 slides 94 which has selective parts 95 arranged to engage the crossbar 86 during its upward movement, will be actuated. The movement of the slides 94 so actuated will be in an upward direction such that the link 98 will cause the arm 99 to pivot about the rod 100. As arm 99 pivots, its topmost end which engages in a slot in the crank 102, moves the crank 102 against the opposition of the spring 121 into engagement with the actuator bail 119. This selectively connects the associated recording elements 103 with the actuator plate 108. As the shaft 50 rotates, the high portion on the cam 109 cooperates with the surface 114 to move the link 111 upwardly. This, in turn, positively moves the actuator plate 108 and its latched recording elements 103 to recording position (see Fig. 14). Similarly, after the elements have been moved into recording position, the cam 110 cooperating with the roller 112 positively returns the actuator plate 108 and its associated recording elements from recording position.

As was previously mentioned, all but one of the crossbars 86 are connected to an individual crank member 89. This is the crossbar of the topmost row and of the back column. It is a reset bar and is identified by numeral 122. The reason for this is to permit easy resetting of the slides 94 and to permit the disengagement of the latches 102 from the bail 119. As can be seen in Figs. 1 and 2 the reset bar 122 is attached to a link 123 at its one end and at its other end to a link 124. A spring 125 cooperates with the link 124 and with the reset bar 122. During the recording operation the spring 125 is expanded as the reset bar moves upwardly with the selected slides 94. After the recording cycle has been completed and the actuator plate 108 has been positively returned from recording position, the spring 125 urges the reset bar to its normal position as shown in Figs. 1 and 2. Each of the slides 94 has a part 126 which is so formed as to cooperate with the reset bar. In this manner when the spring 125 urges the reset bar to its normal position the bar encounters the parts 126 on each of the slides and positively moves each of the slides to normal position. The spring 121 then is enabled to move and to retain the latch 102 from engagement with the bail 119. The position of spring 121 may be changed, but in its position as shown it may be used to reset the slide 94. This would make it possible to do away with parts 126 and use that portion of the slides for character selection purposes.

Explanation of Fig. 15 is important. In Fig. 15 it will be seen that the letter "O" results from data stored in the zone area storing element X and the numeric area storing element 6. The numeric zero "0" results from data stored in the zone area storing element "0" and the numeric area storing element SP. In actual use of the machine it has been desirable that it be done in this manner. It is possible, if necessary, to modify the arrangement and utilize either the letter "O" or the numeric zero interchangeably. This would permit the addition of another character. Similarly from the chart in Fig. 15 it will be seen that the combination of the zone area storing element BL and the numeric area storing element SP do not combine to produce any character. This is so because the reset bar 122 is not connected by a crank 89 to the data receiving part 74SP. This arrangement performs the function of enabling a space to be provided in a recorded line wherever it is so desired. As was noted previously, however, this too can be changed. A crank 89 could be substituted for the link 123 to allow for still another character. In such a case all that would be required would be the addition to the slides 94 of selectively arranged parts 95 to cooperate with the reset bar 122.

*Slide coding*

The coding of the selectively arranged means or parts 95 on the slides to determine how the slides may be selectively operated by the crossbars may be understood by reference to Figs. 12, 13 and 15. The determination of the placement of the parts 95 on the slides is relatively simple. Each crossbar 86 has a predetermined character which it is to select for recording. The parts 95 are arranged on the slides to come into contact with or to be engaged by the selected crossbar as it is moved by its crank.

Let us assume for the sake of example that letter "A" were to be recorded. In Fig. 15 it will be seen that the data in the zone storing element R and the numeric storing element 1 must be combined by the zone member 73R. The data so combined is transmitted by receiving part 771 by way of crank 89 to the associated crossbar 86 which is in the first or front column in the last or bottom row. As the crossbar moves upwardly it must move certain of the slides 94 to record the mosaic of the letter "A" as shown in Fig. 13. In Fig. 12 each of the recording elements of Fig. 13 are designated by a number counting from 1 to 35. Upon co-relating Figs. 12 and 13 it will be obvious that the recording elements involved in the letter "A" are 6, 11, 16, 21, 26, 31, 2, 17, 3, 18, 4, 19, 10, 15, 20, 25, 30 and 35. Thus, if each one of the slides 94, which are connected (as by the linkage 98, 99, 102, 106 and 104) to the correspondingly numbered recording elements are provided with parts 95, then only those slides having the parts 95 in the vicinity of the crossbar will cooperate with the crossbar when it is moved.

The method of determining how the slides may be coded can be modified to suit certain specific requirements for recording characters and symbols other than those shown in Fig. 15.

In practice, as the crossbars move upwardly they engage and move with them the coded parts 95 of the slides. The slides which are moved then interconnect the proper recording elements with the actuator to be moved to and from recording position. This practical arrangement may be modified. In some instances it may be desirable to have all the recording elements normally engaged with the actuator. In such case the coded parts, the latch linkage, and the movement of the crossbars will be modified so that those recording elements which are not required for recording will be disconnected from the actuator upon movement of the crossbars and the slides. Only those recording elements permitted to remain in engagement with the actuator will then record.

As has been recited previously the invention now enables the construction of a smaller more simplified mechanical recording machine accomplishing the same functions as those which utilize larger more expensive electronic counterparts. The sections one of which is shown in Fig. 1 may be lined horizontally next to each other to provide as many characters or symbols in each recording line as may be desired. They may be conveniently backed up to one another to provide multiple lines of recording. All this is easily facilitated because of the narrowness of the section, its smallness in both height and length, and the compact arrangement of its elements. Moreover, because of the ability of the section to store two types of data, to decode the two types of data, to transfer the decoded data and to record the same all in this unitary structure, its space and electrical input requirements are relatively small. Inasmuch as the data storing, decoding, transferring and recording or actuating functions are performed by each section, if a section should cease to function properly it may be replaced quite easily by a new or different section.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a machine for recording characters selectively under the control of coded zone and numeric input data, apparatus for decoding said input data and forming patterns of the characters which are to be recorded under the control thereof, said apparatus comprising a plurality of zone members each individually movable in a given path, a plurality of first lever elements respectively carried by said zone members, there being one of said first lever elements for each of said zone members, a plurality of sets of second lever elements respectively carried by said zone members, there being one set of said second lever elements for each of said zone members, each of said first and second lever elements being pivoted between its ends upon its respective zone member, means for imparting movement to one end of each of said first lever elements, selective blocking means responsive to the zone input data for restraining the other end of any selected one of said first lever elements thereby causing the zone member on which the selected first lever element is pivoted to move, selective blocking means responsive to the numeric input data for restraining one end of any selected one of said second lever elements pivoted on said zone member thereby to produce a pivoting movement of the selected second lever element as its zone member moves, a plurality of individually settable devices respectively associated with the other ends of said second lever elements and each adapted to assume an operative position in response to a pivoting movement of its second lever element, and combinational pattern forming means controlled by said settable devices to form patterns representative of characters which are to be recorded in accordance with the selective positioning of said settable devices.

2. Apparatus as recited in claim 1, wherein each selective blocking means includes individually operable slides one for each of the lever elements associated therewith, each of said slides being movable between an effective position in which it restrains its respective lever element and an ineffective position in which it has no engagement with its lever element.

3. Apparatus as recited in claim 2, wherein each selective blocking means has devices for causing certain slides to operate in response to given input data designations and for causing one of the slides to become effective in the absence of such data designations.

4. Apparatus as recited in claim 1, wherein each of said individually settable devices comprises a bar supported for parallel motion in response to pivoting movement of its associated second lever element, and said combinational pattern forming means includes a plurality of slides having selective interengagement with each of said bars to be actuated thereby in a manner representing a distinctive character pattern.

5. In a machine for recording characters selectively under the control of coded input data, apparatus for decoding said input data and forming patterns of the characters which are to be recorded under the control thereof, said apparatus comprising a member movable in a given path, a plurality of lever elements carried by said movable member, each of said lever elements being pivoted between its ends upon said movable member, means for imparting movement to said movable member, selective blocking means responsive to the coded input data for restraining one end of any selected lever element thereby to produce pivoting motion of said selected lever element as said member moves, a plurality of settable devices individually associated with the other ends of said lever elements and each adapted to assume an operative position in response to pivoting motion of its respective lever element, and combinational pattern forming means controlled by said settable devices to form patterns representative of characters which are to be recorded in accordance with the selective positioning of said settable devices.

6. Apparatus as recited in claim 5, wherein said selective blocking means includes individually operable slides one for each of the lever elements associated therewith, each of said slides being movable between an effective position in which it restrains its respective lever element and an ineffective position in which it has no engagement with its lever element.

7. Apparatus as recited in claim 6, wherein said selective blocking means has devices for causing certain slides to operate in response to given input data designations and causing one of the slides to become effective in the absence of such data designations.

8. Apparatus as recited in claim 4, wherein each of said individually settable devices comprises a bar supported for parallel motion in response to pivoting movement of its respective lever element, and said combinational pattern forming means includes a plurality of slides having selective interengagement with each of said bars to be actuated thereby in a manner representing a distinctive character pattern.

9. In an apparatus for decoding an input data representation consisting of a zone bit combined with a numeric bit, a plurality of movable zone members one for each available zone bit, a plurality of zone levers each pivotally connected to a respective one of said zone members, means for turning each of said zone levers about its pivot on its respective zone member, first selecting means responsive to the zone bit of the input data representation for causing a selected one of said zone levers to fulcrum on a stationary point, thereby imparting movement to its respective zone member as it turns, a plurality of sets of numeric levers each set being carried by a respective one of said zone members, with the numeric levers of each set being pivotally connected to their respective zone member, second selecting means responsive to the numeric bit of the input data representation for causing a selected one of said numeric levers to fulcrum on a stationary point, thereby causing the selected numeric lever to turn about its pivot as the selected zone member moves, and a plurality of individually settable devices one for each of said numeric levers and each responsive to turning motion of its respective numeric lever for registering a character represented by the combined zone and numeric selections.

References Cited in the file of this patent

UNITED STATES PATENTS

| | | |
|---|---|---|
| 2,056,391 | Daly | Oct. 6, 1936 |
| 2,076,713 | Ford | Apr. 13, 1937 |
| 2,076,717 | Fuller | Apr. 13, 1937 |
| 2,111,122 | Mills | Mar. 15, 1938 |
| 2,524,127 | Johnson | Oct. 3, 1950 |
| 2,632,386 | Hyland | Mar. 24, 1953 |
| 2,653,534 | Wockenfuss | Sept. 29, 1953 |